United States Patent [19]

Bowers

[11] Patent Number: 5,025,273
[45] Date of Patent: Jun. 18, 1991

[54] RF DRIVE CIRCUIT FOR AN ION PROJECTION PRINTING HEAD

[75] Inventor: John H. Bowers, Clarksburg, N.J.

[73] Assignee: Armstrong World Industries Inc., Lancaster, Pa.

[21] Appl. No.: 516,647

[22] Filed: Apr. 30, 1990

[51] Int. Cl.[5] .......................................... G01D 15/06
[52] U.S. Cl. ..................................... 346/159; 346/154
[58] Field of Search ................................ 346/154, 159

[56] References Cited

U.S. PATENT DOCUMENTS

| | | | |
|---|---|---|---|
| 4,153,877 | 5/1979 | Fathauer et al. | 455/76 |
| 4,472,807 | 9/1984 | Chubb et al. | 372/38 |
| 4,482,902 | 11/1984 | Bailey et al. | 346/108 |
| 4,841,313 | 6/1989 | Weimer | 346/159 |

OTHER PUBLICATIONS

J. R. Ramsey & D. Bennewitz "Ion Printing Technology" *Journal of Imaging Technology*, vol. 12; No. 3, Jun., 1986, p. 144 et seq.

*Primary Examiner*—George H. Miller, Jr.
*Attorney, Agent, or Firm*—Martin Lukacher

[57] ABSTRACT

In order to drive the RF lines (electrodes) of an ion projection printing head or cartridge, driver circuits are provided which generate high voltage, radio frequency signals with rapid envelope rise and fall times so that dots of varying density in accordance with a gray scale may be formed on a rapidly moving dielectric surface. A separate RF driver circuit for each line includes an active switching device, preferably an FET. A series resonant circuit is connected across the active device. This circuit is provided by an inductor connected in series with the effective capacitance presented by the RF electrode of the ion projection head which is being driven. The inductor and effective capacitance defines a series resonant circuit. The active device is driven via a pulse amplifier by pulses repetitive at the RF rate and the active device is connected to a power supply, preferably through a parallel resonant circuit which broadens the frequency response characteristic (flattens the effective resonance peak, so that the current switched through the device is of sufficient magnitude to develop a peak-to-peak voltage across the effective capacitance of the RF electrode of the head to provide sufficiently high peak-to-peak voltage RF cycles. These cycles may be gated to develop ion dots on the dielectric surface having the required gray scale gradiation; the magnitude of the ion charge and the gray scale depending upon the number of cycles of the RF drive voltage used while projecting ions onto the dielectric surface.

18 Claims, 3 Drawing Sheets

RF DRIVE CIRCUIT FOR AN ION PROJECTION PRINTING HEAD

DESCRIPTION

The present invention relates to RF driver circuits and particularly to RF driver circuits for developing high voltage across a reactive load at high RF frequencies exceeding 5 MHz (e.g., 10 MHz–100 MHz and higher RF frequencies).

The invention is especially suitable for use in providing an RF driver circuit for producing, a high frequency, high voltage RF signal which may be rapidly switched on and off, on RF driver lines of an ion projection printing head or cartridge. The invention is also useful in other applications where RF drive pulses are desired; for example, for driving a transducer used in ultrasonic imaging applications and in radar applications.

Ion projection printing, which is also known as ion deposition imaging, utilizes ion projection heads or cartridges having a multiplicity of RF lines which are selectively driven with high voltage RF signals to generate plasmas. Ions or electrons are projected from these plasmas under the control of electrodes which enable dots of charge to be deposited on a dielectric surface in lines at extremely high speed (speed sufficient to generate hundreds of pages per minute of images). The design of such heads and their application in ion projection printing is the subject matter of an article by J. R. Rumsey and D. Bennewitz entitled "Ion Printing Technology" which appeared in the Journal of Imaging Technology, Volume 12, No. 3, June, 1986, page 144 et seq.

In order to operate ion deposition printing equipment at high speeds and particularly to obtain gray scale in the dots which are printed, it has become necessary to drive the RF lines of the print head at high RF frequencies, for example, 10 MHz and above. At such frequencies the techniques which have been suggested for driving the RF lines becomes unsatisfactory because of the demand for extremely high drive currents through the active switching devices which are used. Such circuits utilize a step-up transformer to develop the necessary voltages in response to current switched by the active device. The capacitance of the RF line (also called the RF electrode) is connected across the secondary of the step-up transformer, this parallel resonant circuit being resonant at the desired RF frequency. At relatively low RF frequencies of the order of 1 MHz, at which such parallel resonant circuit drivers are used, the impedance reflected by the transformer into which the active device works is sufficiently high to enable the use of available, practical active devices. At higher frequencies, the impedance drops rapidly; the variation in impedance varying in accordance with the RF frequency and the square of the turns ratio of the transformer. Then the current which must be switched by the active device becomes so high (for example, of the order of 100 Amps) that it cannot be handled by practical devices, especially devices such as FETs, of the size required. The problem therefore remains of generating high frequency, high voltage RF energy for the RF lines of the head. This problem is exacerbated because of the need to switch the RF energy on and off with rapid envelope rise and fall times so that the RF signals may be multiplexed onto a multiplicity (for example, 20) RF lines of the ion printing head.

For further information respecting conventional RF driver circuits for ion deposition printing heads, reference may be made to U.S. Pat. No. 4,841,313 issued June 20, 1989.

Accordingly, it is the principal object of this invention to provide an improved RF driver circuit which is especially adapted for producing a high frequency RF signal of sufficient amplitude and with sufficiently fast envelope rise and fall times for operating an ion projection printing head of a high speed ion projection printer.

It is an ancillary object of the present invention to provide an improved RF driver circuit which provides high frequency, high voltage energy using practical, available active devices, and especially devices which can be packaged in a space sufficiently small so as to be located in the immediate vicinity of the load which uses the energy from the circuit.

It is a further object of the present invention to provide an improved resonant RF driver circuit in which the above-discussed shortcomings of the presently known technology are substantially obviated.

Briefly described, an RF driver circuit in accordance with the invention, capable of providing an RF AC voltage of sufficient peak-to-peak amplitude to produce a plasma when applied to the RF lines of an ion projection head (the lines presenting an effective capacitance), makes use of an active switching device and a drive circuit and a power supply for providing current pulses to the device at a repetition rate related to the radio frequency which is desired. An inductor is connected in series with the device and with the effective capacitance provided by the line of the head which is to be driven, the inductance of the inductor and effective capacitance defining a series resonant circuit which is resonant at the desired RF frequency. The drive circuit and power supply for operating the active device are such that the current pulses are of sufficient amplitude to develop the desired peak-to-peak RF voltage amplitude across the effective capacitance (viz. the reactive load). In other words, the active device is driven at approximately the resonant frequency of the series resonant circuit from a fixed frequency source (such as the clock of the ion printing head controller) or alternatively, from feedback derived from the output (across the effective capacitance presented by the RF line being driven) which configures the RF driver circuit into an oscillator topology. A secondary load circuit is preferably used between the active device and power supply so as to present another load on the active device. This secondary load circuit is preferably a parallel resonant circuit, resonant at the desired RF frequency. It may have a resistor connected thereacross to effectively dampen the secondary resonances that are created by the addition of this secondary load circuit. Because of the low impedance created by the series resonant load circuit at resonance, most of the AC current flows through the series resonant load circuit. The low impedance also minimizes the voltage swing at the output of the active device. The AC current that is switched by the active device may be controlled by controlling the signal for driving the device and the voltage which provides the DC current therethrough thereby controlling the magnitude of the AC current that flows through the series resonant circuit. Alternately, the losses of the series resonant circuit (which can be represented as a resistor connected in series with the series resonant circuit), in conjunction with the losses of the active device and the power supply voltage determine the magnitude of the AC current that is switched by the active device and hence made to flow through the RF line. The voltage that is impressed on the RF electrode (each RF line of the ion projection head) is therefore of sufficient magnitude (e.g., 1600 V. peak to peak) to develop the requisite ionizing field.

The foregoing and other objects, features and advantages of the invention as well as a presently preferred embodiment thereof, will become more apparent from a reading of the following description in connection with the accompanying drawings in which.

Figure 1:
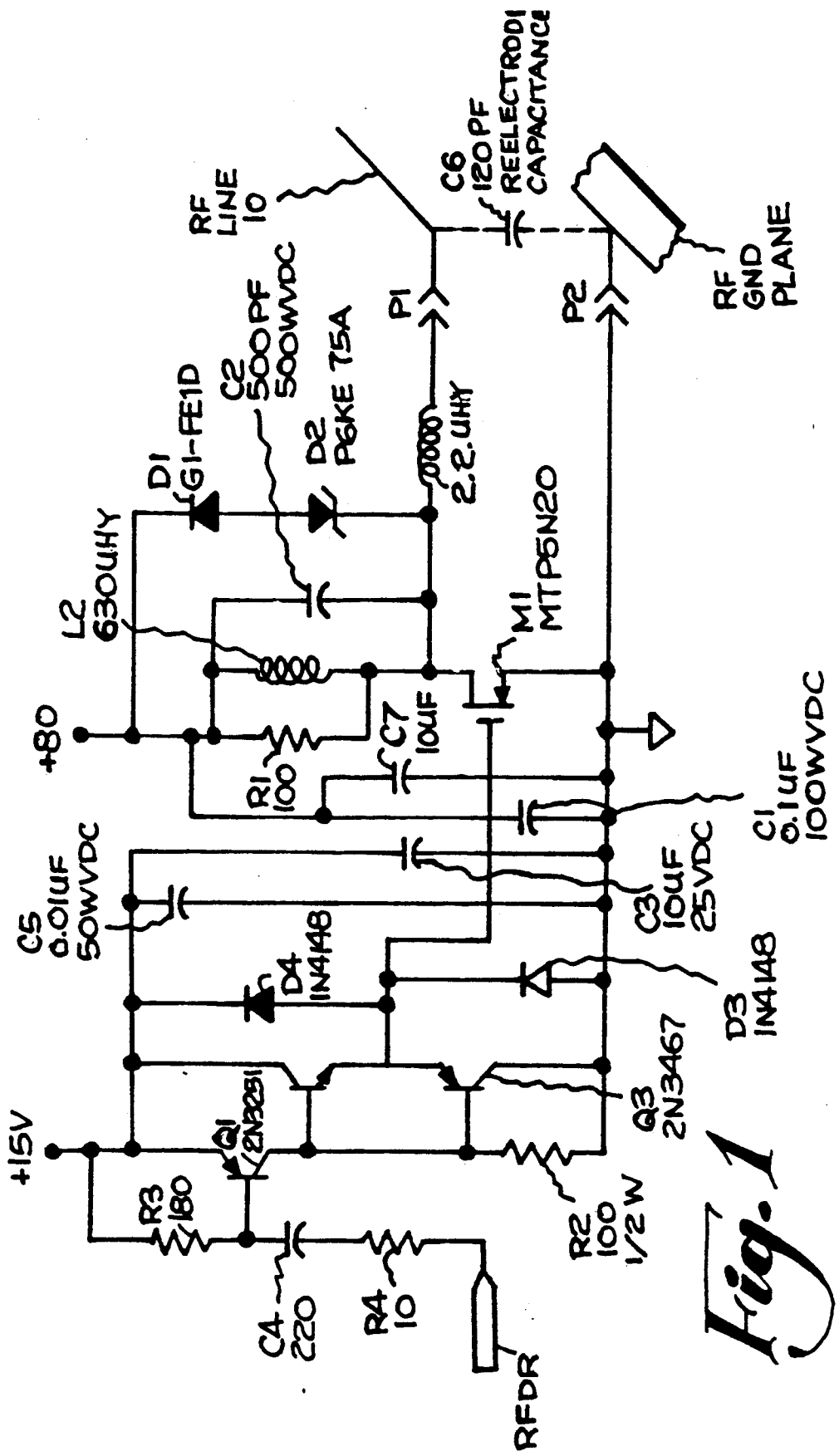
FIG. 1 is a schematic diagram of an RF driver circuit in accordance with an embodiment of the invention.
Figure 3:
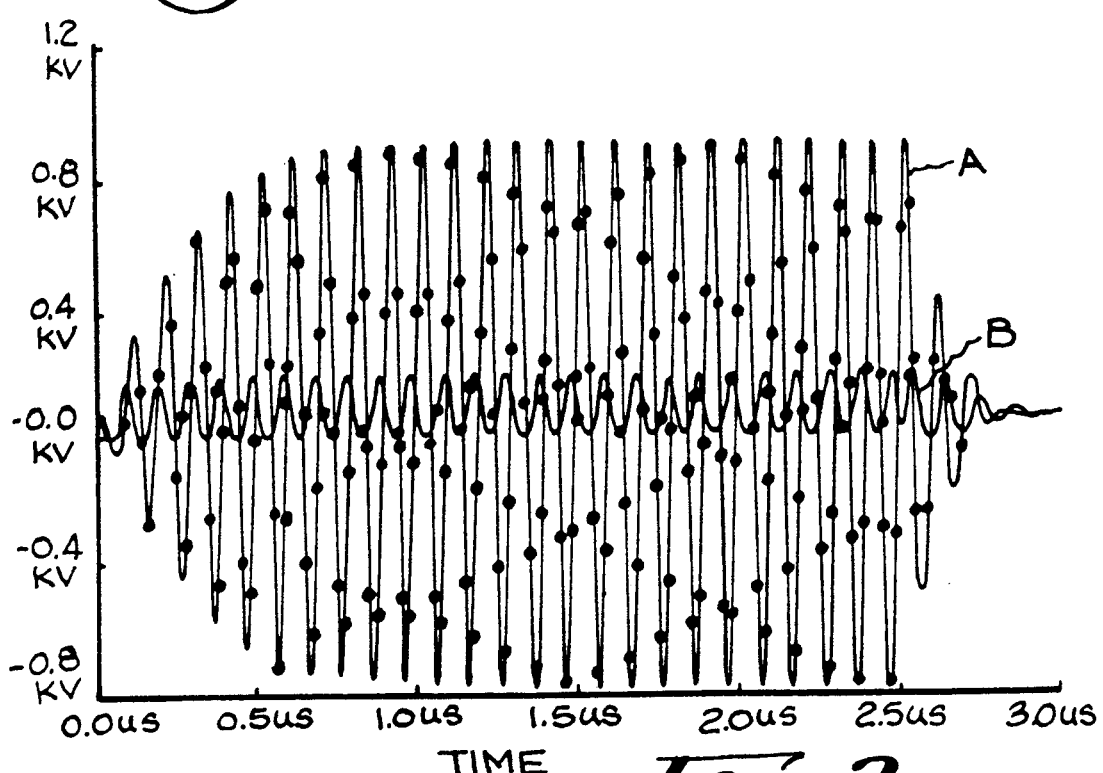
FIG. 3 are plots showing a typical RF AC burst pulse as it appears at the drain electrode of the FET shown in FIG. 1 (plot B) and at the RF electrode of the ion projection head (plot A).

Referring to FIG. 1, there is shown an electrical schematic of a presently preferred embodiment of the invention which is designed to drive an RF line 10 of an ion projection head. This line may be one of twenty such lines which are disposed adjacent to each other and run in the direction in which lines of dots are generated by the head in accordance with signals which are applied to control electrodes or fingers of the head. Each line 10 presents an effective capacitance indicated as C6 between the line and the ground plane of the head. In a typical head, this capacitance is 120 picofarads (PF). The head is connected to the drive circuitry by connectors illustrated diagramatically at P1 and P2. The RF drive circuit of FIG. 1 is designed to generate high voltage RF energy at 10 MHz and with a peak-to-peak voltage of 1.6 KV as shown in waveform A on FIG. 3.

The input signal RFDRV is generated in the controller for the ion projection printer. It is a pulse train having a repetition rate of 10 MHz in this embodiment of the invention. Other drive frequencies (e.g., from 5-100 MHz) may be used depending on the printing speed and number of grey scales desired. The controller may, for example, use transistor/transistor logic (TTL) so that the pulse train RFDRV varies between 0 and +5 volts. This pulse train is coupled through R4 and C4 to the base of a transistor amplifier. This amplifier is operated as a class C amplifier and provides a gain of approximately 10. Q1 therefore buffers the RFDRV pulse train and increases its amplitude of the pulses to approximately 15 volts. The reverse bias assures that Q1 is off (non-conductive) until the RFDRV signal is enabled.

Q2 and Q3 constitute a class B emitter follower buffer amplifier. They are driven by the amplified (15 volt) RFDRV pulses from the Q1 stage. They provide a low output impedance to drive the highly capacitive and relatively low impedance (e.g., 100 ohms at 10 MHz) load presented by the gate of M1. This assures that the rise and fall times of the leading and lagging edges of the pulses are minimized. D4 and D3 act as suppressors of voltage spikes. DC current for the FET M1 is supplied from a power supply (+80 volts). This power supply has noise filtering capacitors C1 and C7 connected across the power supply (between +80 volts and reference potential). The smaller capacitor C1 filters high frequency noise while the larger electrolytic capacitor C3 filters low frequency noise components. This ensures a low power supply AC impedance. Similarly, parallel connected capacitors C3 and C5 are connected across the 15 volt supply (between +15 volts and reference potential) to ensure a low power supply impedance.

An inductor L1 is connected in series with the RF electrode or line capacitance C6 thereby comprising a series resonant circuit which is resonant at 10 MHz, the frequency of the RF signal which drives the RF line 10. This series resonant circuit, which has a very low impedance at or near its resonant frequency and a rising impedance at frequencies away from resonance, is the dominant load for FET M1 for continuous operating conditions. A characteristic of resonant circuits is Q, a value which represents the damping factor of any resistive losses in the resonant circuit. In this embodiment of the invention the resistive loss component of the impedance presented by this load, that is the value an equivalent series resistor placed in series with the series resonant circuit, plus the "on" resistance of FET M1 is typically about 6 ohms. With an 80 volt power supply, this enables FET M1 to switch a current of approximately 13 amps through the series resonant circuit. Because of the series resonant mode of operation, a higher voltage of approximately 1700 volts peak to peak is made to appear across the RF line (C6) than at the drain of the FET M1 (approximately 80 volts peak to peak). The voltage across RF line (C6) is illustrated in curve A of FIG. 3. The voltage across the FET (at the drain of M1) is illustrated in curve B of FIG. 3.

A secondary load circuit consisting of L2 and C2 is connected between the DC supply (+80 volts) and the drain. In addition to providing a source of DC current for FET M1, this circuit, in conjunction with L1 and C6, creates secondary parallel resonances on either side of the series resonant frequency of L1 and C6. These secondary parallel resonances, which are damped by the shunt resistor R1, broaden the effective resonance peak of the circuit beyond that of the series resonant circuit comprised of L1 and C6 alone. The location of the secondary parallel resonance peaks is determined by the values of L1, C6, L2 and C2. R1 is selected to flatten the response between the two parallel resonance peaks thereby creating a uniform frequency response between them as measured across C6. This is done to the end of minimizing the rise and fall times of the envelope of the RF voltage (the rise and fall times being shown at the beginning and end of waveform A in FIG. 3). The longer envelope rise time (as compared to the envelope fall time) in the illustrated circuit is because of limitations in the power supply voltage which limits the rate at which energy can be pumped into the load. The fast fall time is achieved because the stored energy in the series resonant circuit is allowed to cause a much high voltage to be developed at the drain of the FET M1 before it is dissipated by D2 (a "transorb" zener diode). D1 and D2 are optional and control the peak voltage at the drain of M1 when the drive signal RFDRV is removed (the FET M1 is switched off).

In operation, the drive voltage applied to the gate of the FET M1 causes it to draw current from the power supply (+80 volts) when switched on into its conductive state of sufficient amplitude to generate the desired (1.6 KV peak-to-peak amplitude) RF signal on the RF line 10 (across C6) (i.e., the product of the impedance of said load and said current being sufficient to produce the requisite peak-to-peak voltage).

Figure 4:
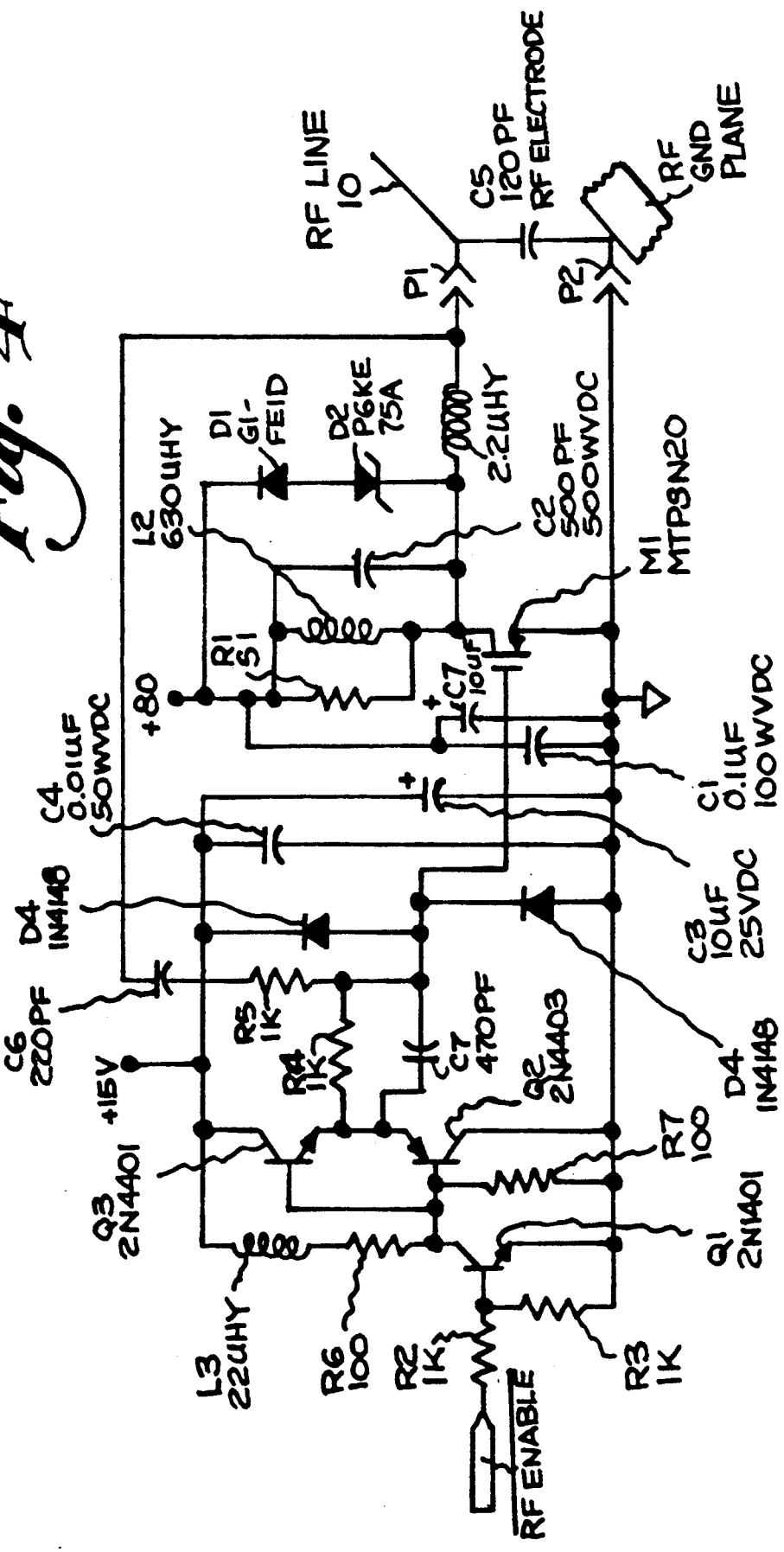
FIG. 4 is a schematic diagram similar to FIG. 1 of the driver circuit in gated oscillator topology.

It may also be desirable to operate the driver in an oscillator rather than in an amplifier configuration. As shown in FIG. 4, a feedback circuit including a capacitor C6 is connected between the RF line output terminal (between L1 and C5) and the output of the second stage of a bias switch (the Q2, Q3 stage). A voltage divider (R5, R4 and C7) is used to select the amplitude of the feedback voltage. The oscillator is enabled by the RF enable signal which is applied to the first stage (Q1) of the bias switch.

Figure 2:
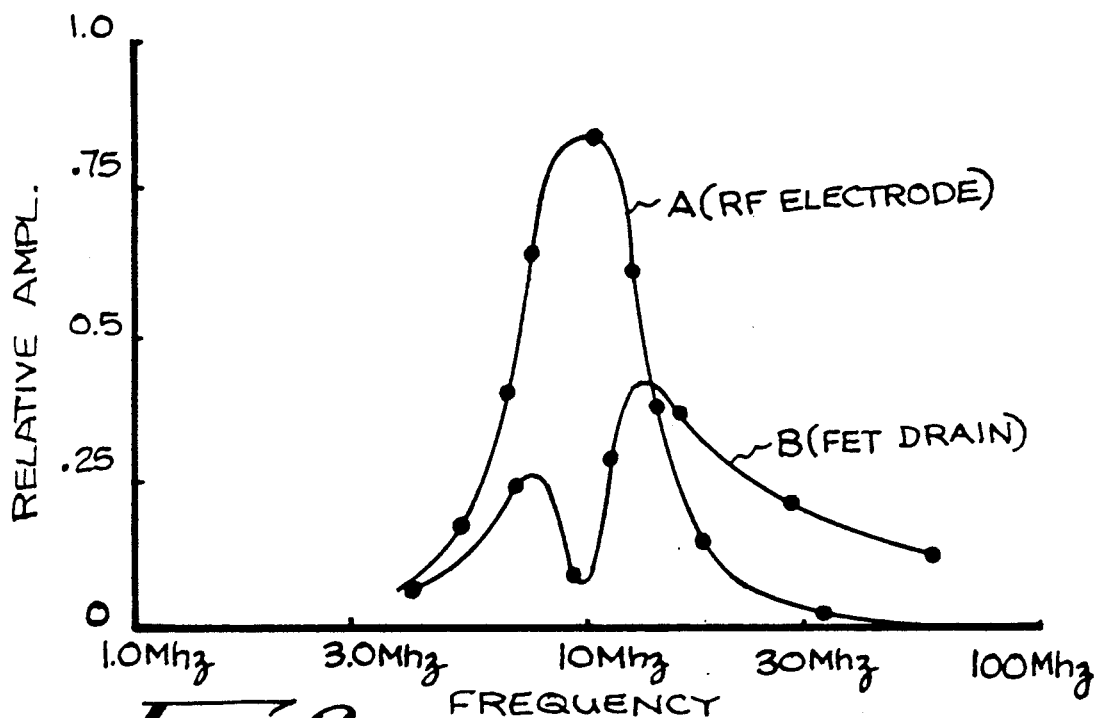
FIG. 2 are plots showing the frequency response (plot B) of the RF driver circuit as presented across the active device (the drain electrode of the FET) and (plot A) across the load (the effective capacitance of the RF electrode or RF line)

From the foregoing description it will be apparent that there has been provided an improved RF drive circuit which is especially adapted for driving the RF electrodes or lines of an ion projection head. Variations and modifications in the herein described circuit, within the scope of the invention, will undoubtedly suggest themselves to those skilled in the art. For example, depending upon the frequency of operation, additional capacitance may be added in parallel with the load capacitance of the RF electrode to adjust the relative impedances of the series and parallel resonant circuits; in effect, changing the location of the double peaks of the plot B in FIG. 2. The load may be an inductive load and series resonance provided with a capacitor. The illustrated circuit is also practical in that it provides a high voltage greater than 1 KV peak-to-peak AC waveform at high RF frequencies and a rapid envelope rise and fall time of the high frequency voltage across the load. The reference potential may be the bias on the screen of the ion projection head (e.g., −650 volts) instead of ground, as shown. It will be understood that the values of the components given in FIGS. 1 & 4 are for purposes of illustration and not limitation.

I claim:

1. A circuit for generating a radio frequency (RF) AC voltage of sufficient peak-to-peak amplitude to produce a plasma when applied to RF lines, which present an effective capacitance, of an ion projection printing head, said circuit comprising means including an active switching device for providing current pulses through said device at a repetition rate related to said radio frequency, an inductor connected in series with said device and said effective capacitance, said inductor and effective capacitance defining a series resonance circuit resonant at said RF frequency, and said current pulse producing means including means for providing said current pulses at sufficient amplitudes to develop said sufficient peak-to-peak amplitude across said effective capacitance.

2. The circuit according to claim 1 wherein said AC frequency exceeds about 5 MHz.

3. The circuit according to claim 2 wherein said AC frequency is of the order of 10 MHz.

4. The circuit according to claim 1 wherein said series resonant circuit has a first frequency response across said effective capacitance and further comprising means defining a second frequency response characteristic across said affective capacitance which is broader than said first frequency response.

5. The circuit according to claim 4 wherein said means for providing said current pulses through said device comprises a source of D.C. voltage and a parallel resonant circuit resonant at said RF frequency connected in series with said source and said active device.

6. The circuit according to claim 4 further comprising a resistor connected across said parallel resonant circuit for flattening said second frequency response.

7. The circuit according to claim 1 wherein said active device has a control electrode, and wherein said means for providing said current pulses such that they are of said sufficient amplitude comprises a source of said pulses, and pulse amplifier means responsive to pulses from said source for driving said control electrode.

8. The circuit according to claim 7 wherein said pulse amplifier means comprises a class "C" amplifier stage connected to said source of pulses, and a second circuit having bipolar transistors of opposite conductive type having collector emitter paths connected in series and having bases connected to said class C stage to provide a complementary emitter follower stage, a junction between said transistors in the connected collector to emitter paths thereof, said junction being connected to said control electrode.

9. The circuit according to claim 8 wherein said means for providing said current pulses series said device comprises a source of D.C. voltage and a parallel resonant circuit resonant at said RF frequency connected in series with said source and said active device.

10. The circuit according to claim 9 wherein said active device is a FET having gate, source and drain electrodes, said series resonant circuit being connected between said source to said drain.

11. The circuit according to claim 10 wherein said parallel resonant circuit is connected between said drain and said D.C. voltage source.

12. The circuit according to claim 1 wherein said means for providing said current pulses comprises means for feeding back said voltage across said effective capacitance to said active device to define an oscillator operative at said RF frequency.

13. The circuit according to claim 12 further comprising means for enabling said oscillator connected to said means for feeding back said voltage.

14. An RF driver circuit for driving a load presenting a reactive impedance at a predetermined peak-to-peak voltage of a certain radio frequency which comprises an active device, a source of D.C. voltage connected to said device, means for driving said device on and off to switch said current of a peak amplitude the product of which and said reactance of said load corresponds to the peak amplitude of said peak-to-peak voltage at a rate related to said certain radio frequency, a reactance connected to said load and of a value of reactive impedance to define with said load a series resonant circuit resonant at said certain radio frequency, said series resonant circuit being connected across said device.

15. The circuit according to claim 14 further comprising a parallel resonant circuit resonant at said certain frequency connected in series with said D.C. source and said device.

16. The circuit according to claim 15 further comprising a resistor connected to said parallel resonant circuit for reducing the Q of said parallel resonant circuit.

17. The circuit according to claim 15 further comprising a source of drive pulses at said certain frequency, said active device having a control electrode, and a pulse amplifier connecting said drive pulses to said source and increasing the amplitude thereof sufficiently to produce current of said peak amplitude for the voltage applied to said device from said D.C. source.

18. The circuit according to claim 15 wherein said driving means is provided by a feed back circuit connected between said load and said active device for defining an oscillator operative at said certain frequency.

* * * * *